United States Patent [19]

Osada

[11] Patent Number: 5,442,604
[45] Date of Patent: Aug. 15, 1995

[54] ACCESS CONTROL DEVICE

[75] Inventor: Yutaka Osada, Fujisawa, Japan

[73] Assignee: Victor Company of Japan, Ltd., Yokohama, Japan

[21] Appl. No.: 983,028

[22] Filed: Nov. 30, 1992

[30] Foreign Application Priority Data

Nov. 29, 1991 [JP] Japan .................. 3-340017
May 29, 1992 [JP] Japan .................. 4-163780

[51] Int. Cl.$^6$ .............................................. G11B 7/00
[52] U.S. Cl. ............................ 369/44.11; 369/44.32; 369/44.28; 369/44.25
[58] Field of Search ............... 369/44.11, 44.26, 44.27, 369/44.28, 44.29, 32, 54, 50, 44.32, 44.25; 360/77.07, 77.05, 77.04, 78.06

[56] References Cited

U.S. PATENT DOCUMENTS

| | | | |
|---|---|---|---|
| 4,669,074 | 5/1987 | Hsieh et al. | 369/44.29 |
| 4,785,439 | 11/1988 | Okada et al. | 369/44.29 |
| 4,951,272 | 8/1990 | Wachi et al. | 369/44.28 |
| 5,003,524 | 4/1991 | Ikeda | 369/44.28 |
| 5,077,716 | 12/1991 | Takeda et al. | 369/44.34 |
| 5,087,997 | 2/1992 | Osada et al. | 369/44.29 |
| 5,090,001 | 2/1992 | Ito et al. | 369/44.29 |
| 5,101,386 | 3/1992 | Kojima et al. | 369/44.28 |
| 5,117,410 | 5/1992 | Akiyama | 369/44.28 |
| 5,249,168 | 9/1993 | Kagami et al. | 369/44.27 |

OTHER PUBLICATIONS

Excerpt from chapter 1 "Optical Disk Drive"; pp. 160–161, published Feb. 10, 1989.
Excerpt from "CXA1082BQ/BS"; pp. 174–175 published Mar. 1991.

Primary Examiner—Georgia Y. Epps
Assistant Examiner—Nabil Hindi
Attorney, Agent, or Firm—Lowe, Price, LeBlanc & Becker

[57] ABSTRACT

An access control device for use in an optical disk system provided with an information recording disk medium having a concentric or spiral track for recording information thereon, a recording/reproducing head for recording information on or reproducing information from the information recording disk medium, a tracking actuator for controlling the head in such a manner to follow a center of a track, a tracking error detection circuit for detecting a difference between the position of the head and the center of the track and a tracking drive circuit for driving the tracking actuator. Further, the access control device is used to move the recording/reproducing head to a desired or target track. Furthermore, the access control device is provided with a relative speed detection circuit for detecting the relative speed of the head with respect to the target track and reference-speed signal generation means for outputting a signal indicating a reference value of the relative speed. Additionally, the tracking drive circuit is adapted to be controlled according to the tracking error signal after controlled according to a difference between an output of the relative speed detection circuit and the reference speed signal when tracking control operation is started. Thereby, when an operation to be currently performed by the system is changed to the tracking control operation, the tracking control operation can be stably started and performed. Further, an access time can be substantially decreased.

6 Claims, 10 Drawing Sheets

ACCESS CONTROL DEVICE

BACKGROUND OF THE INVENTION

1. Field of the Invention

This invention generally relates to an access control device and more particularly to a servo circuit of an optical disk (or disc) drive unit of an optical disk system (namely, a magneto-optical disk system). Especially, this invention relates to a servo circuit suitable for an optical disk system employing what is called a 1-beam push-pull track error detection method.

2. Description of the Related Art

First, a conventional optical disk system will be outlined hereinbelow.

The conventional optical disk system has an optical pickup device (namely, an optical head) used to converge laser light emitted from a semiconductor laser and to irradiate the laser light onto a target position on a disk medium to thereby recording and reproducing information. Such an optical pickup unit is comprised of an optical system and a driving system.

The optical system is a mechanism for converging laser light onto the disk medium and detecting the difference between the actual position of a laser light spot and the desired position (namely, the target position) on the disk medium. Further, the optical system consists of a semiconductor laser, lenses, a beam splitter, a photodiode or the like.

The driving system has a driving mechanism for maintaining the fixed positional relation between the actual position of the laser light spot (namely, the laser beam spot) and the target position on the disk medium by performing a focusing control operation of making an objective lens follow an axial deflection of an optical disk, as well as a tracking control operation of making the objective lens follow a radial deflection. Further, the driving system is mainly comprised of a magnet, a coil and a supporting member.

Additionally, the driving system has a further driving mechanism for driving a seeking control system to move the entire optical-pickup device to a target position in the direction of a radius of the optical disk.

The conventional optical disk system further has an access control device which is a control device for moving a laser beam spot to a target position.

Hereinafter, the access control device of the conventional optical disk system will be outlined by referring to FIGS. 1(a) and 1(b).

FIG. 1(a) schematically illustrates the configuration of a first example of the conventional access control device.

In the device of FIG. 1(a), a slider 18 is adapted to move in the direction of a radius of an optical disk 10 by being guided by a rail 19. Further, the slider 18 is driven by a coarse-motion motor (hereunder referred to simply as a coarse motor) as 21 driven by a slider drive circuit 9.

Generally, an operation of the optical disk device, by which the optical pickup device moves (or is moved) onto a desired sector of a target track, is referred to as an access operation thereof. Moreover, a part of this access operation, by which the optical pickup device moves in the direction of a radius of the optical disk to the vicinity of the target track, is referred to as a seeking operation.

Furthermore, in case where the distance to be made by the optical pickup device is large, the seeking operation is referred to as a coarse seeking operation. In contrast, in case where the distance to be made by the optical pickup device corresponds to one track to hundreds of tracks, the seeking operation is referred to as a fine seeking operation.

As shown in FIG. 1(a), the whole optical pickup device 2 is fixed to the slider 18. The coarse seeking operation of the optical pickup device is conducted according to an instruction issued by a microprocessor unit (hereunder abbreviated as an MPU) 12. Thereby, the slider 18 is moved by operating the coarse motor 21 so as to move the laser beam spot to the vicinity of the target track.

In contrast, the fine seeking operation is an operation of moving the laser beam to a track, which is distant from the current position thereof one to hundreds of tracks, by stopping the slider 18 and effecting what is called a track jumping.

As shown in FIG. 1(a), an objective lens 3L is connected to a tracking actuator 3 through a spring member and is adapted to move under the control of the tracking actuator 3.

The laser beam first passes through the objective lens 3L and is then reflected on a recording surface of the optical disk 10. Subsequently, the reflected beam is incident upon a photodiode 23 for detecting a signal through a beam splitter (not shown) and a condenser lens (or a converging lens (not shown)). The photodiode 23 is a quadrant photodiode, and the difference in position (in the direction of a radius of the optical disk) between the current position of the laser beam spot and the target track is detected by a track error detection circuit 4 by effecting what is called a 1-beam push-pull method and using a plurality of outputs of this photodiode as represented by a tracking error signal TE.

A tracking control circuit 13 and a track jumping control circuit 13A are controlled according to the signal TE outputted by the track error detection circuit 4.

Further, during the optical pickup device 2 moves above a spiral track a slider normal-control circuit (hereunder sometimes referred to as a slider control circuit) 14 controls the slider drive circuit 9 to move the slider 18.

The position of the objective lens 3L is detected by a lens position sensor 6. Further, a signal representing the detected position of the objective lens 3L is inputted to both of the slider control circuit 14, which controls the slider drive circuit 9 to move the slider 18 in such a manner that the sensor 6 outputs no signal representing the detected position of the objective lens 3L (namely, the center (or optical axis) of the objective lens 3L corresponds exactly to the optical axis of the laser beam) at the time of recording or reproducing information to be stored in the optical disk, and a lens holding circuit 7A (shown in FIG. 4(a)) which holds the objective lens 3L at a predetermined position. Further, outputs of the tracking control circuit 13, a brake circuit 13B (to be described later) and the track jumping control circuit 13A are connected to input terminals 62, 64 and 63 of a switch 15A, respectively. A tracking drive circuit 5 for driving the tracking actuator 3 is controlled in accordance with a signal outputted from an output terminal 61 of this switch 15A.

The position of the slider 18 is detected by a linear encoder 20, the output of which is applied to a slider position control circuit 17 for stopping the slider, to a slider speed control circuit 8 for controlling a speed at which the slider is transferred, and to the slider normal control circuit 14. Output terminals of the circuits 17, 8 and 14 are connected to input terminals 66, 67 and 68 of a switch 16A, respectively. The slider drive circuit 9 for driving the coarse motor 21 is controlled according to a signal issued from an output terminal 65 of the switch 16A.

Further, the connecting relation between the switches 15A and 16A is controlled by the MPU 12. For example, in case of performing a coarse seeking operation, the terminals 65 and 67 are connected to each other. Thus the slider 18 is transferred at a high speed. When the slider reaches a desired position, the terminal 65 becomes connected to the terminal 66 instead of the terminal 67. As a result, the slider 18 is quickly stopped and the terminal 61 is connected to the terminal 64.

In case of effecting a fine seeking operation, the terminals 65 and 61 are connected to those 68 and 63, respectively. Furthermore, in case of controlling a tracking operation, the terminals 65 and 61 are connected to the terminals 68 and 62, respectively.

Meanwhile, the access operation of this conventional optical disk system will be described hereinbelow by referring to FIG. 1(b).

First, in steps S1 and S2, the number of revolutions per predetermined time (namely, the rotation speed represented in terms of, for instance, revolutions per minute (rpm)) of a rotation system including the optical disk is set to be a desired number of rotations thereof.

Next, in step S3, the system starts an operation (namely, what is called a focussing servo operation) of controlling the position of the objective lens 3L to set the waist of the laser beam on the recording surface of the optical disk.

Subsequently, in step S4, it is confirmed that the focussing servo is locked.

Then, in step S5, a track pull-in operation (to be described later), which is preparatory for a tracking operation, is performed.

Next, in step S6, a tracking servo circuit becomes on, namely, a tracking operation is effected. If it is found in step S7 that a good result of the tracking operation is not obtained, the tracking servo circuit becomes off in step S8 and the track pull-in operation is repeatedly performed.

Thereafter, the information indicating such an address (hereunder sometimes referred to as the address information) is read in step S9. If it is found in step S10 that the distance between the read address and the desired or target address (namely, the absolute value of the difference between the current track corresponding to the read address and the target track corresponding to the target address) is equal to or greater than a predetermined value (n), a coarse seeking operation is carried out (namely, the laser beam is moved according to such a distance) in step S11. This coarse seeking operation is effected by the slider speed control circuit 8 and the slider position control circuit 17. In contrast, if it is found in step S10 that such a distance is less than the predetermined value (n), the system judges in step S12 whether or not the current track matches the target track (namely, whether or not the difference between the current and target tracks is equal to 0).

Meanwhile, if the coarse seeking operation is performed in step S11, the track pull-in operation and the tracking operation (hereunder, these operations will be sometimes referred to as the tracking control operation collectively) are performed again in steps S5 and S6 under the control of the tracking control circuit 13 from a position of the laser beam, which is set by the seeking control system 8 and 17, to read the address information.

In contrast, if it is found in step S12 that the address illuminated by the laser beam does not matches the target address (namely, the current track does not match the target track), the system performs the following operation (namely, what is called a track jumping operation) in step S13 to make the laser beam reach the target address. Namely, the laser beam is made reach the target address not by being moved one track at a time but by being continuously moved at a time in response to the difference between the current track and the target track. This operation mode (namely, the mode of the track jumping operation) is controlled by the track jumping control circuit 13A.

However, a conventional optical disk drive for driving an eccentric optical disk (for example, a compact disk (CD)) has a drawback that in case where a radial deflection due to the eccentricity is large, the tracking control operation is commenced and performed stably in steps S5 to S8.

FIG. 2 is a waveform chart for illustrating the waveform of an example of the tracking error signal.

As is seen from FIG. 2, the tracking is not started if the tracking control circuit becomes on when the relative speed (hereunder sometimes referred to simply as a radial relative speed) of a track in the direction of a radius thereof is large (namely, the frequency of the tracking error signal TE is high but the period thereof is small).

This is due to the fact that the laser beam needs to be rapidly accelerated in the direction of a radius of the track because the laser beam, which has been stopped, should follow the track which is moving in the direction of the radius thereof.

There have been developed conventional access control devices to eliminate the above described drawback of the conventional optical disk drive.

FIG. 1(a) illustrates a first example of such a conventional access control device (hereunder sometimes referred to as a first conventional access control device). Further, the access control device of FIG. 1(a) is characterized by employing the brake circuit 13B. This brake circuit 13B requires an RF signal, the phase of which is shifted by 90 degrees from that of the tracking error signal TE. However, in an unused region of a write-once compact disk read-only memory (WO CD-ROM), there is formed a guiding groove, the depth of which is nearly half of that of each pit of an ordinary CD-ROM, by being slightly wobbled by marks (or pits) corresponding to address codes. Namely, no pits are formed in the unused region of the WO CD-ROM. Therefore, no RF signals can be obtained from such an unused region of the WO CD-ROM. Thus mirror signals cannot be stably generated. Consequently, the brake circuit cannot be used.

Next, a second example of the conventional access control device (hereunder referred to as a second conventional access control device) will be described hereinbelow. Note that the second conventional access control device does not employ a special circuit such as the brake circuit of the first conventional access control device.

FIG. 3 illustrates the waveform of a tracking error signal of the second conventional access control device.

As shown in this figure, it is detected at a moment t1 that the relative speed of a track with respect to a laser beam becomes equal to or less than a predetermined speed (namely, the period T1 becomes equal to or longer than a predetermined period of time). At that time, the tracking control circuit becomes on. This conventional device, however, has a defect in that there is required a rotation waiting time until the relative speed of the track with respect to the laser beam becomes equal to or less than a predetermined speed and thus it takes time to access information. Incidentally, an access operation of the second conventional access control device is similar to that of the first conventional access control device as described above by referring to FIG. 1(b). However, in case of the second conventional access control device, the track pull-in operation is effected in step S5 by repeatedly checking whether the relative speed of the track with respect to the laser beam becomes equal to or less than the predetermined speed, and waiting until the relative speed of the track becomes equal to or less than the predetermined speed.

Turning to FIG. 4, there is shown a third example of the conventional access control device (hereunder sometimes referred to as a third conventional access control device). The configuration of the third conventional access control device is similar to that of the second conventional access control device except the following respects. Namely, a reproduced signal is detected from a plurality of output signals of the photodiode 23 and is then supplied to a demodulator 25. Further, a track No. represented by the output signal of the photodiode 23 is read and transmitted through the demodulator 25 to the MPU 12. Moreover, an output signal LC of the position sensor 6 is inputted to a lens holding circuit 7A for fixedly holding the objective lens 3L at a predetermined position at the time of effecting the seeking operation. Incidentally, an access operation of the third conventional access control device is similar to that of the second conventional access control device. Therefore, the description of the access operation is omitted for simplicity of description.

However, the optical disk system employing the third conventional access control device has drawbacks in that when the optical disk system is subjected to external vibrations or shocks in step S5 in the direction, in which the seeking of a track is effected, the tracking pull-in operation is not stably effected or the control system for controlling the objective lens 3L comes to slightly oscillate or the objective lens 3L largely vibrates to the maximum limit or no focussing signal is obtained and thus the laser beam spot is out of focus, and in that the access time becomes relatively large.

As above stated, the first conventional access control device or system has a drawback in that the tracking pull-in operation cannot be stably effected when the tracking control circuit is changed from the OFF-state thereof to the ON-state thereof after the seeking operation.

Further, the second conventional access control device or system, in which the tracking is performed when the relative speed of a track with respect to a laser beam becomes equal to or less than a predetermined value, has a drawback in that it takes time to access information stored in the optical disk (namely, an access time is relatively long).

Moreover, the third conventional access control device or system has a drawback in that if the optical disk system is subjected to external vibrations or shocks when the tracking control operation is started (namely, the track pull-in operation is commenced) after the seeking operation, the track pull-in operation is not stably performed and in that the access time is relatively long.

The present invention is created to eliminate the drawbacks of the conventional access control devices.

It is, accordingly, an object of the present invention to provide an access control device of an optical disk system provided with an optical disk (like an unused region of a WO CD-ROM) issuing no RF signal (or a signal having a phase shifted 90 degrees from that of a tracking error signal), which can increase stability in performing in the tracking pull-in operation and can reduce the access time.

SUMMARY OF THE INVENTION

To achieve the foregoing object, in accordance with an aspect of the present invention, there is provided an improved access control device for use in an optical disk system provided with an information recording disk medium having a concentric or spiral track for recording information thereon, a recording/reproducing head for recording information on or reproducing information from the information recording disk medium, a tracking actuator for controlling the head in such a manner to follow a center of a track, a tracking error detection circuit for detecting a difference between the position of the head and the center of the track and for outputting a tracking error signal representing the detected difference and a tracking drive circuit for driving the tracking actuator. Further, this access control device is used to move the recording/reproducing head to a desired or target track. Furthermore, this access control device is provided with a relative speed detection circuit for detecting the relative speed of the head with respect to the target track according to the tracking error signal inputted thereto from the tracking error detection circuit, and reference-speed signal generation means for outputting a reference radial signal indicating a reference value of the relative radial speed, at which a laser beam should travel with respect to the track, according to a distance between the target track and the laser beam, wherein, before the tracking actuator starts a tracking control operation on the laser beam with respect to the track, the tracking drive circuit is controlled according to a difference between an output of the relative speed detection circuit and the reference speed signal.

Thus, when an operation to be currently performed by the system is changed to the tracking control operation from, for example, the seeking operation (hereunder sometimes referred to as the seeking control operation), the frequency of change in the relative position of a laser beam with respect to a track is converted to a voltage. This voltage is detected as corresponding to the relative speed of the laser beam with respect to the track. Further, the reference speed, which decreases as the distance between the laser beam spot and the target track on the optical disk decreases, is outputted from the microprocessor unit. Moreover, the tracking actuator is controlled according to a difference signal designating the difference between the reference speed and the relative speed in such a fashion that the difference signal indicates 0. Therefore, whenever the laser beam reaches the target track, the relative speed becomes a constant speed which is nearly 0. Consequently, the operation to be currently effected can be easily changed from the seeking control operation to the tracking control operation, and the tracking operation can be stably performed.

When the tracking actuator is transferred by the slider and the state of the tracking control operation is changed from an OFF-state to an ON-state, or when the tracking control operation is started for the first time after the rotation of the optical disk is started and the focussing system becomes on, the control of the relative speed is effected by setting a track away from the current position or track, which is illuminated with the laser beam, by a few tracks as the target position or track. Consequently, the tracking control operation can be stably performed on the current track. Consequently, even in case of employing an optical disk issuing no RF signal (or a signal having a phase shifted 90 degrees from that of a tracking error signal), the stability in performing in the tracking pull-in operation can be increased and the access time can be decreased because of no necessity of waiting until the relative speed of the track is reduced to a predetermined value.

Further, in accordance with another aspect of the present invention, there is provided another improved access control device for use in an optical disk system provided with an optical pickup device for recording information on and reproducing information from an optical disk having a concentric or spiral track for recording information thereon, a tracking actuator for controlling a laser beam spot on the optical disk in such a manner to follow a center of a track, a tracking error detection circuit for detecting a difference between the position of the laser beam spot and the center of the track and a tracking drive circuit for driving the tracking actuator according to an output of the tracking error detection circuit. Further, this access control device is used to move the laser beam spot to a target track or position. Furthermore, this access control device is provided with at least a lens position sensor for detecting the position of an objective lens of the optical pickup device and a lens vibration suppression circuit controlled according to an output of the lens position sensor for outputting a signal to suppress the vibration of the objective lens. Moreover, the access control device suppresses the vibration of the objective lens by supplying outputs of the lens vibration suppression circuit to the tracking drive circuit for a predetermined period of time immediately before and after a state of the optical disk system is changed from a state, in which the tracking actuator does not perform a control operation on the laser beam spot with respect to the track, to a state in which a tracking control operation is performed, wherein the lens vibration suppression circuit includes a non-linear amplifier and means for increasing an amplification factor thereof when the output of the lens position sensor becomes large.

Thus, when an operation to be currently performed by the optical disk system is changed from a seeking (control) operation to a tracking control operation, outputs of the tracking control circuit and the lens vibration suppression circuit are supplied to the tracking drive circuit for driving the tracking actuator. Namely, the objective lens is controlled according to both of outputs of the tracking control circuit and the lens position sensor. Thus the characteristics of a control system including the tracking drive circuit, the tracking actuator and the objective lens are effective in damping the vibration of the system. Thereby, the control system is not vibrative even in case where external noise signals and, for example, accelerating force are applied thereto. Consequently, the objective lens never vibrates largely. As the result, the operation to be currently performed by the optical disk system can be stably changed to the tracking control operation. Further, the positioning of the laser beam spot on the target track can be securely effected. Furthermore, the access time of the optical disk system can be substantially reduced.

In accordance with still another aspect of the invention, there is provided an improved access control device for use in an optical disk system including an information recording disk medium which has a concentric or spiral track for recording information thereon, an optical pickup device for recording information on or reproducing information from the information recording disk medium, a tracking actuator for controlling the optical pickup device in such a manner to follow a center of a track, a tracking error detection circuit for detecting a difference between the position of the optical pickup device and the center of the track and for outputting a tracking error signal representing the detected difference and a tracking drive circuit for driving the tracking actuator. The access control device for moving the optical pickup device to a target track includes a relative speed detection circuit for detecting the relative speed of the optical pickup device with respect to the target track according to the tracking error signal inputted thereto from the tracking error detection circuit; a reference-speed signal generation means for outputting a reference radial speed signal indicating a reference value of the relative radial speed, at which a laser beam should travel with respect to the track, according to a distance between the target track and the laser beam; and a lens position sensor for detecting the position of an objective lens of the optical pickup device. The access control device further includes a lens vibration suppression circuit controlled according to an output of the lens position sensor for outputting a signal to suppress the vibration of the objective lens, wherein when a state of the optical disk system is changed from a state, in which the tracking actuator does not perform a control operation on the laser beam with respect to the track, to a state in which a tracking control operation is performed, before a tracking control operation is started the tracking drive circuit is controlled according to a difference between an output of the relative speed detection circuit and the reference speed signal, wherein outputs of the lens vibration suppression circuit are supplied to the tracking drive circuit to suppress the vibration of the objective lens for a predetermined period of time immediately before and after a state of the optical disk system is changed from a state, in which the tracking actuator does not perform a control operation on the optical pick-up device with respect to the track, to a state in which a tracking control operation is performed. Further, the lens vibration suppression circuit includes a non-linear amplifier and increases an amplification factor thereof when the output of the lens position sensor becomes large.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

First, an access control device of an optical disk drive of a WO CD-ROM (hereunder sometimes referred to as a first embodiment of the present invention) will be described in detail by referring to FIGS. 5 to 7.

Figure 1A:
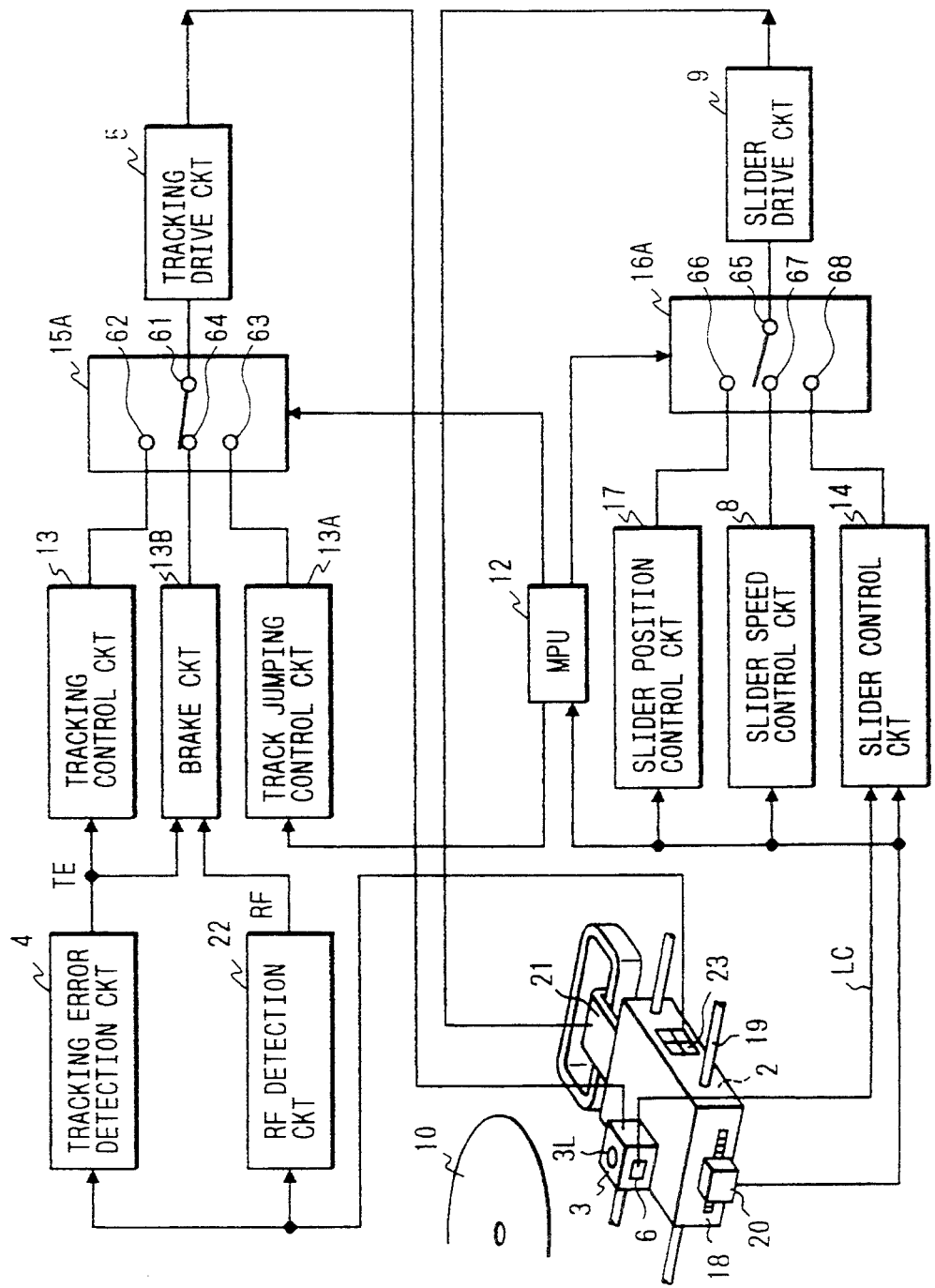
FIG. 1(a) is a schematic block diagram for illustrating the configuration of a first conventional access control device.
Figure 1B:
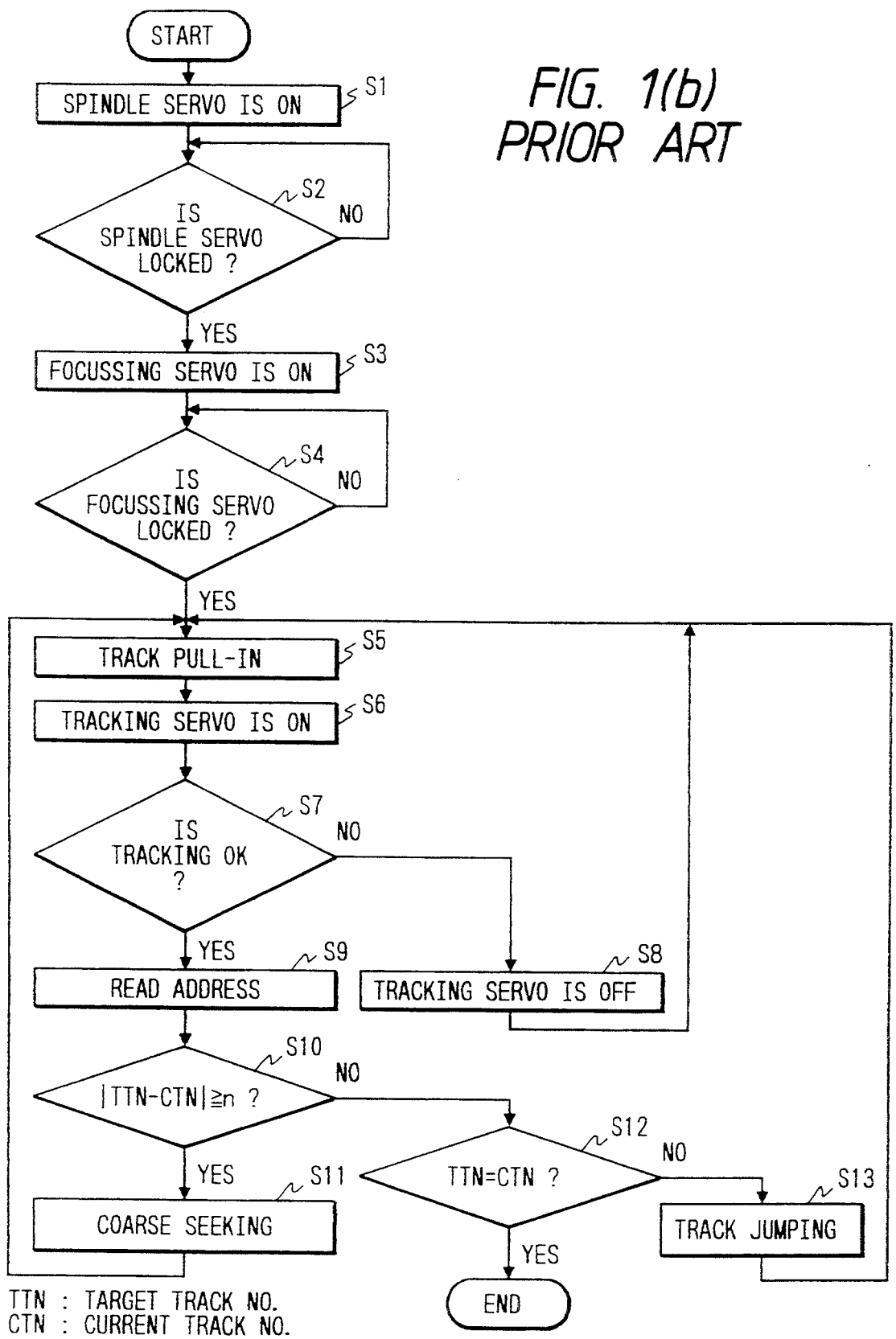
FIG. 1(b) is a flowchart for illustrating an access operation of the device of FIG. 1(a)
Figure 2:
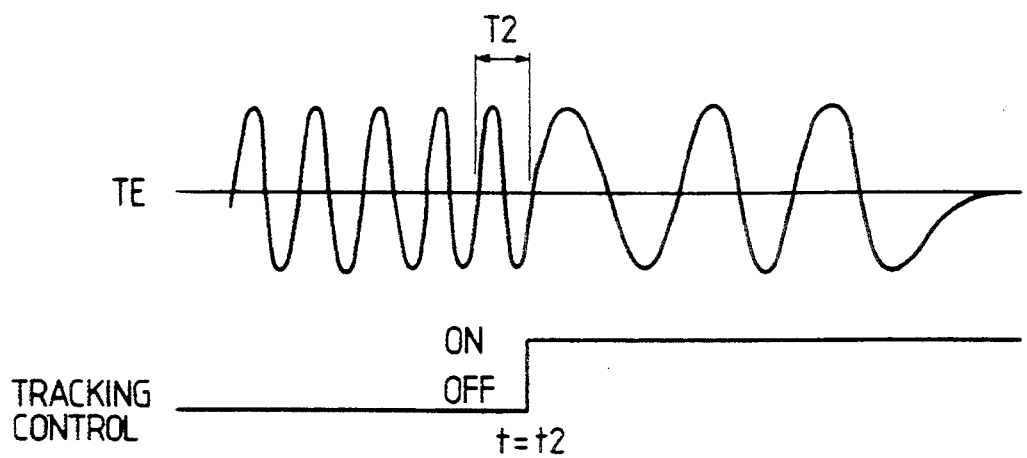
FIG. 2 is a waveform diagram for illustrating the waveform of an example of a tracking error signal.
Figure 3:
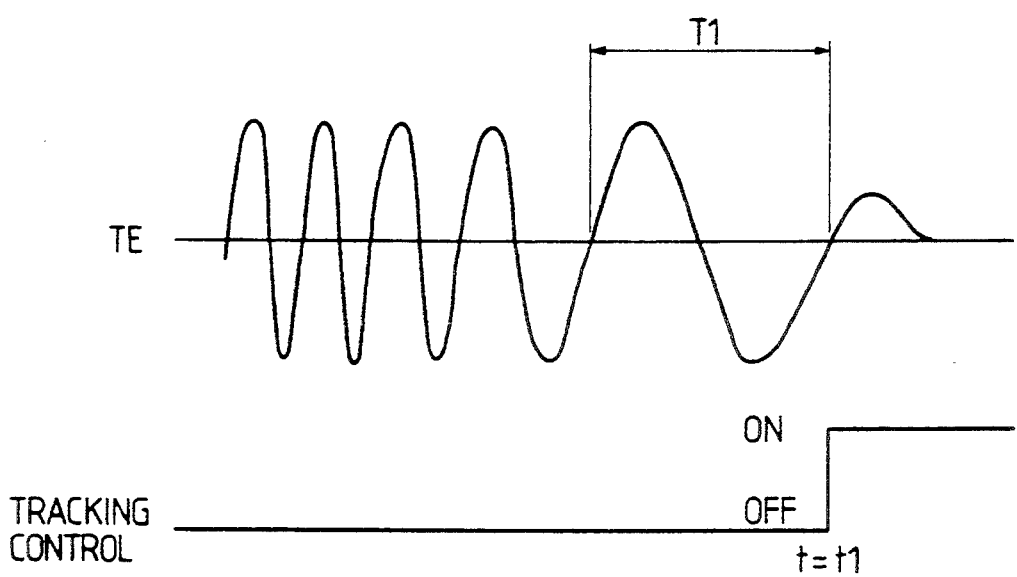
FIG. 3 is a waveform diagram for illustrating the waveform of a tracking error signal used in a second conventional access control device.
Figure 5A:
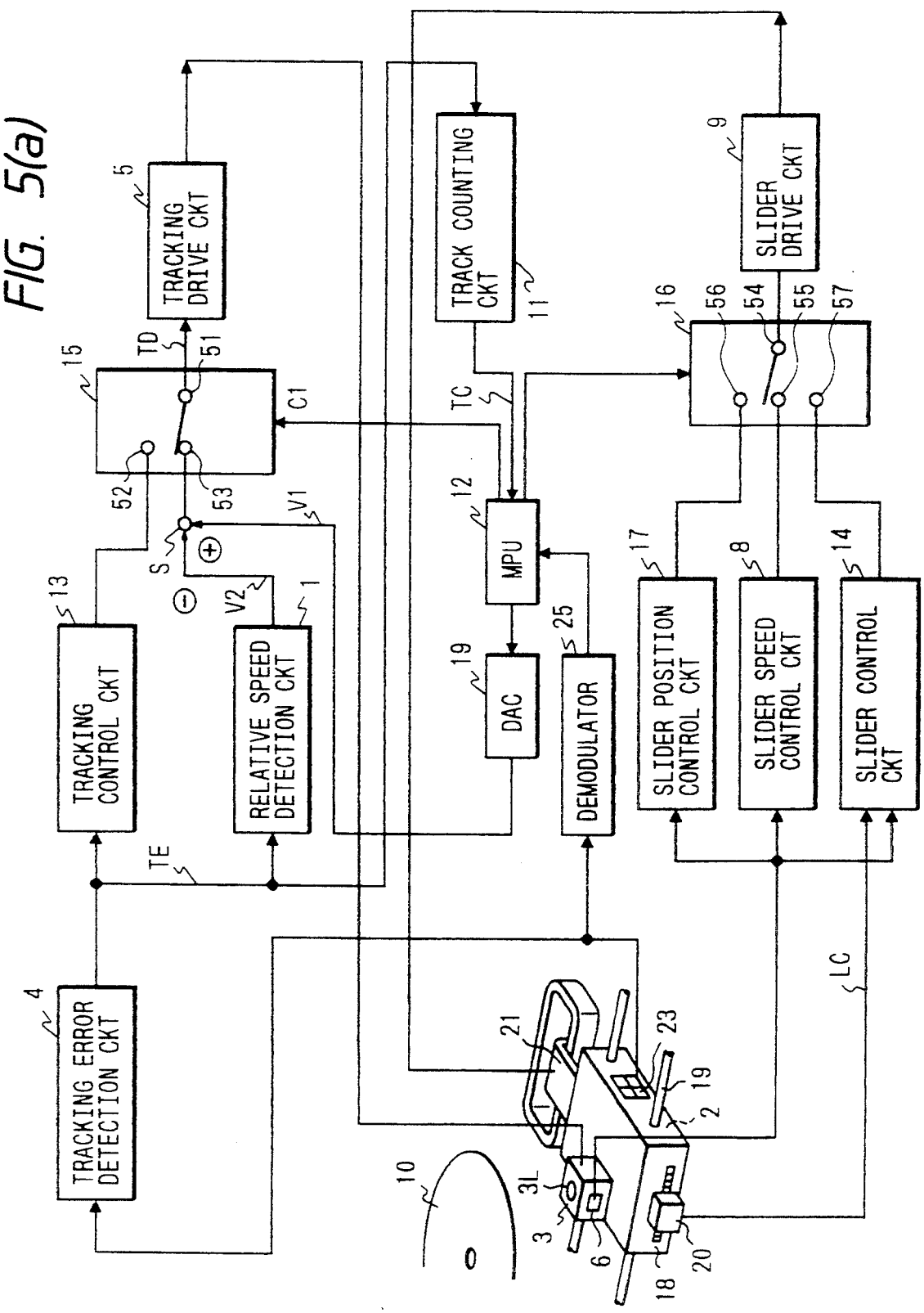
FIG. 5(a) is a schematic block diagram for illustrating the configuration of an access control device of the present invention.
Figure 5B:
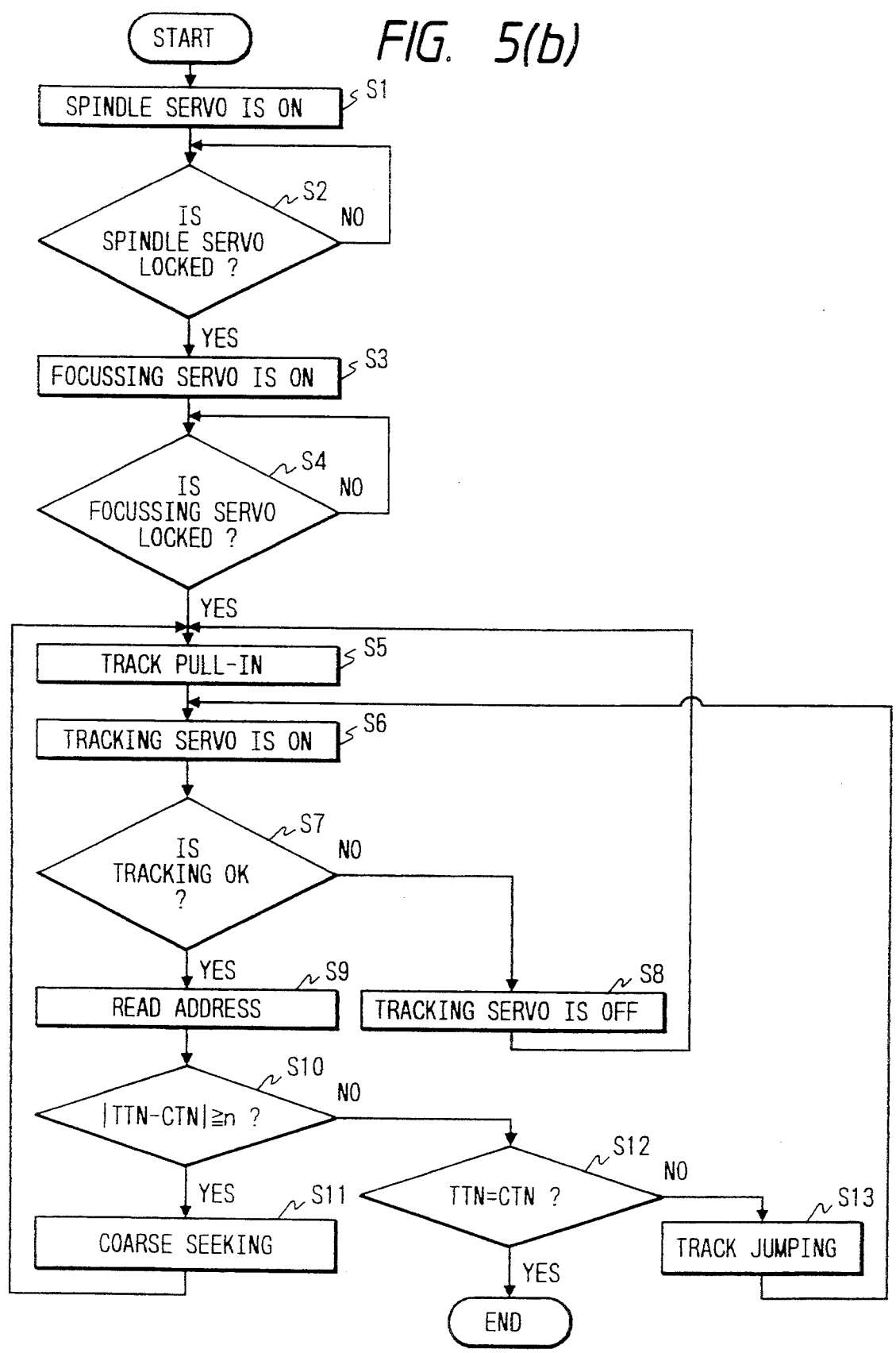
FIG. 5(b) is a flowchart for illustrating an access operation of the device of FIG. 5(a)

FIG. 5(a) illustrates the configuration of this access control device (namely, the first embodiment) of the present invention. Further, FIG. 5(b) illustrates an access operation of the access control device of FIG. 5(a). Moreover, FIG. 6 illustrates the configuration of the principal part of the access control device of FIG. 5(a). Incidentally, in these figures, like reference characters denote corresponding parts of the conventional access control device of FIG. 1(a). Thus, the descriptions of such parts of the first embodiment will be omitted herein for brevity of the description. Additionally, an access operation of the access control device of FIG. 5(a) is similar to that of the conventional access control device as described by referring to FIG. 1(b). Further, the track pull-in operation to be performed by the first embodiment in step S5 is similar to that in case of the second conventional access control device. However, note that the tracking operation is performed in step S6 instead of effecting the track pull-in operation in step S5 just after the track jumping operation is effected in step S13.

In the device of FIG. 5(a), when the track jumping operation is effected by the actuator, an input signal TD to the tracking drive circuit 5 is changed from an output signal of the tracking control circuit 13 to a signal outputted from a summing point S in accordance with a control signal C1 outputted from the MPU 12. To the summing point S, a relative speed signal V2 representing the radial relative velocity or speed of a laser beam with respect to a track, which is detected by the relative speed detection circuit 1 on the basis of an output signal TE of the tracking error detection circuit 4, is inputted. In addition, a radial reference speed of the laser beam (namely, a radial relative speed, at which the laser beam should travel according to the distance between a target track and the laser beam with respect to the track is computed by the MPU 12. Then, a reference speed signal V1 representing the computed reference speed is also inputted to the summing point S through a digital-to-analog converter (hereunder abbreviated as a DAC).

Thereafter, a difference signal representing the difference between the values respectively indicated by the signals V1 and V2 is outputted from the summing point S. The tracking drive circuit 5, as well as the tracking actuator 3, is controlled in accordance with this difference signal. Thus, the relative speed is made to be a constant speed, which is nearly 0, by controlling the relative speed of the laser beam with respect to the track after the laser beam is moved by effecting the seeking operation. If the tracking control circuit becomes on at that time, an extremely stable tracking control operation is commenced.

Figure 6:
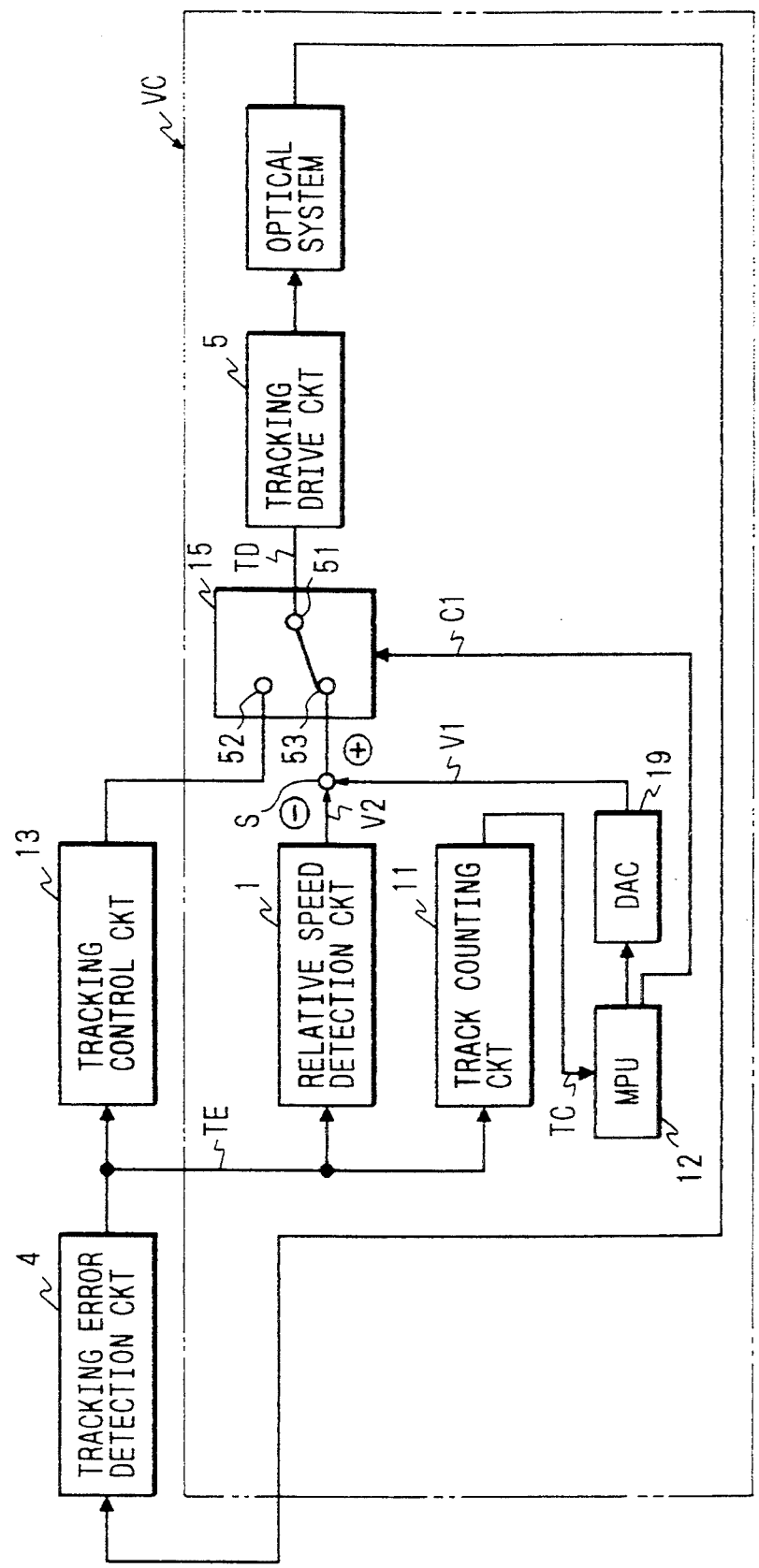
FIG. 6 is a schematic block diagram for illustrating a primary part of the device of FIG. 5(a)

Turning to FIG. 6, there is shown the configuration of the principal part of this access control device.

Hereinafter, the principal part of the first embodiment will be described in detail by referring to FIG. 6.

In this figure, a relative speed control portion VC for controlling the value represented by the relative speed signal V2 is indicated by being enclosed with a two-dot chain line. This relative speed control portion VC serves to control the radial relative speed of the laser beam with respect to the track in such a way to become nearly 0 when the laser beam reaches the target track in the fine seeking operation. Thereby, a tracking control operation can be stably performed just after the operation to be currently performed by the system is changed to the tracking control operation.

Figure 7:
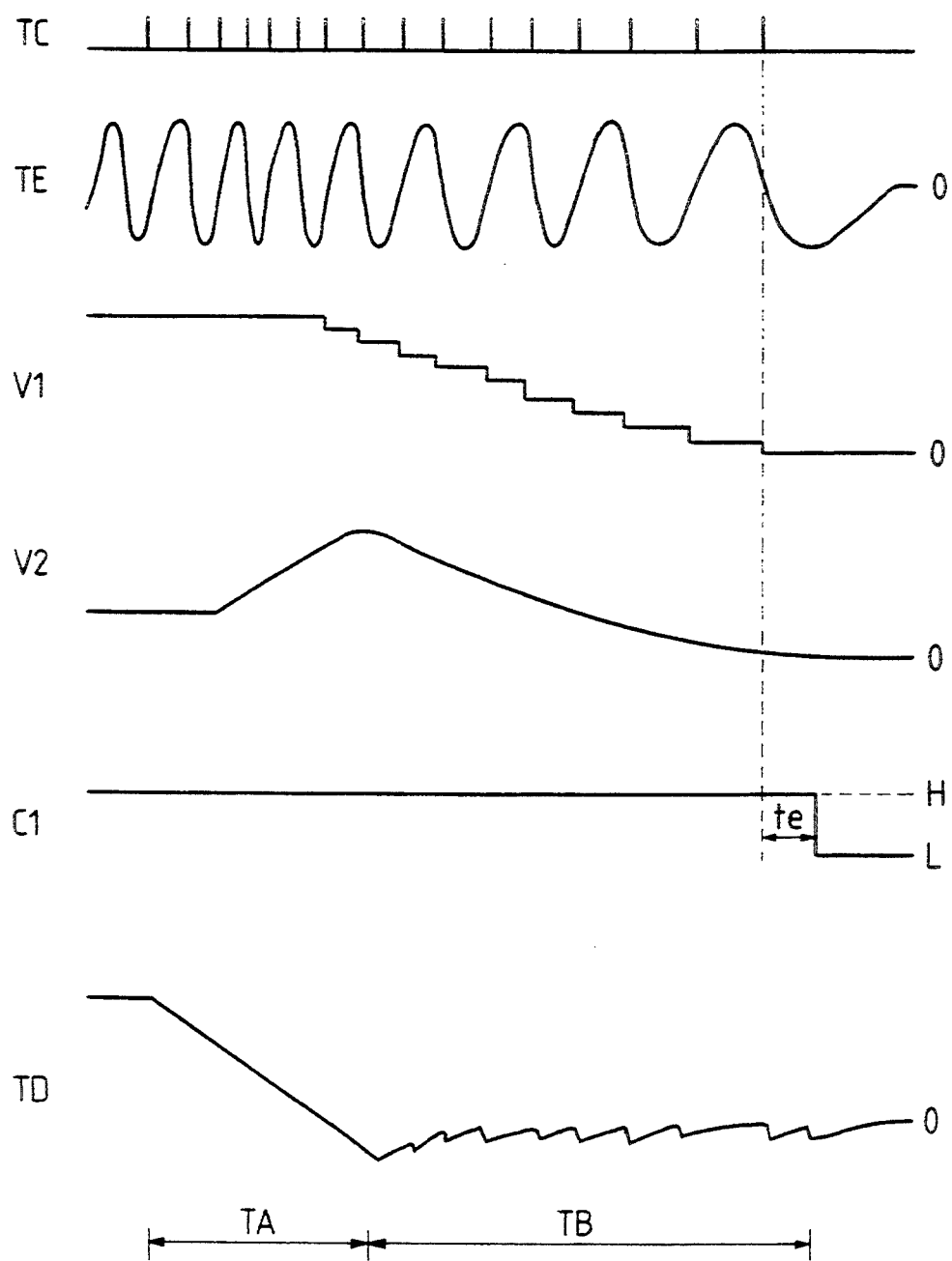
FIG. 7 is a waveform diagram for illustrating the waveforms of signals used in the device of FIG. 5(a) when an operation to be performed by the device is changed to the tracking control operation.

Referring now to FIG. 7, there are shown the waveforms of signals respectively used in various portions of the device when the operation to be currently performed by the system is changed to the tracking control operation.

Hereinafter, an operation of the principal part of the first embodiment in the period of time, in which the operation to be currently performed by the system is changed to the tracking control operation, will be described by referring to FIGS. 6 and 7.

The relative speed signal V2 of these figures is obtained by converting the frequency of the tracking error signal TE into a voltage by using the relative speed detection circuit 1 and indicates a value proportional to the radial relative speed of the laser beam with respect to the track.

Further, the tracking error signal TE is inputted to and a pulse TC generated at what is called a zero crossing point of the tracking error signal TE is outputted from a track counting circuit 11. This pulse-like signal TC is applied to the MPU 12.

Furthermore, when the pulse TC is inputted to the MPU 12, an interruption to the MPU 12 occurs. At each interruption, the MPU 12 recognizes that the distance between the laser beam and the target track decreases by a half track. Then, the next data (hereunder sometimes referred to as reference speed data) indicating a reference speed, which is stored in the ROM, is loaded into the MPU 12 to update current data indicating the reference speed represented by the signal V1. Subsequently, a signal V1 representing new data, which indicates the new reference speed, is applied to the summing point S. Hence, the reference speed indicated by the signal V1 varies in synchronization with the pulse TC.

Incidentally, reference speed data stored in the ROM serves to indicate target values of the radial relative speed of the laser beam with respect to the track (namely, target speeds to which the radial relative speed should be regulated or adjusted). The remaining distance (or current distance) between the laser beam and the target track or position is classified into one of successive ranges, each of which has maximum and minimum values respectively corresponding to adjacent zero crossing points of the tracking error signal TE. The reference speed data indicates a reference speed corresponding to each range of the distance between the laser beam and the target track or position. As the remaining distance (namely, the number of the remaining tracks between the laser beam and the target track) decreases, the value of the reference speed indicated by the reference speed data decreases. When there is no remaining track, the relative speed becomes nearly 0. Additionally, the reference speed data is preliminarily computed.

The speed of the laser beam in the direction of a radius of the optical disk is increased in a region TA of FIG. 7 but is decreased in a region TB of FIG. 7 in such a manner to follow the reference signal V1 according to the tracking drive signal TD supplied from an output terminal 51 of a switch 15 connected to an input terminal of the tracking drive circuit 5.

When a predetermined period te of time passes since the laser beam reaches a position which is a half track short of the target track, the terminal 51 of the switch 15 is disconnected from the terminal 53 and is connected to the terminal 52. Thus an operation to be currently performed by the device is changed to the tracking control operation. Therefore, when the radial relative speed represented by the signal V2 becomes almost 0, the operation to be currently performed by the access control device is changed to the tracking control operation. Consequently, the tracking control operation is started in a stable manner.

As described above, in case of the access control device of the present invention, the frequency of the tracking error signal is converted into a voltage when the track seeking operation is performed by using the actuator. Then, a signal corresponding to this voltage is used as the signal V2 representing the relative speed of a laser beam with respect to a track. Subsequently, the difference between the relative speed represented by the signal V2 and the reference speed, which is designated by the signal V1 and decreases according to the number of the remaining tracks indicated by a signal outputted from the MPU 12, is obtained. A signal representing the obtained difference is employed as a control signal TD for controlling the tracking drive circuit 5. Thereby, whenever the laser beam reaches the target track, the relative speed becomes a constant speed which is nearly 0. After an operation to be currently performed by the access control device is changed from the fine seeking operation (namely, a speed control operation) to the tracking control operation, the tracking control operation can be stably effected.

Next, another access control device (hereunder sometimes referred to as a second embodiment) of the present invention will be described in detail hereinbelow by referring to FIGS. 8 and 9.

Figure 4:
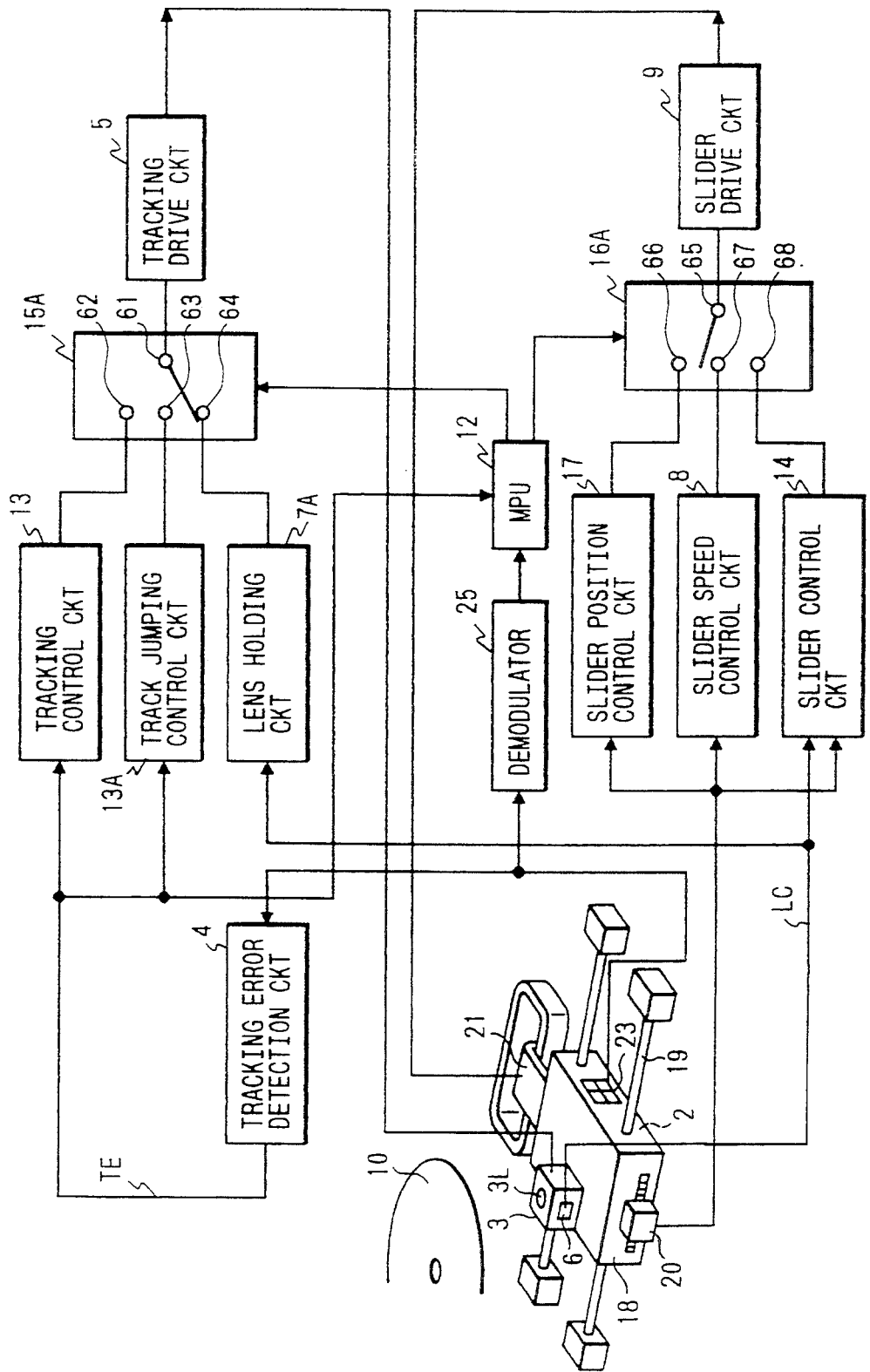
FIG. 4 is a schematic block diagram for illustrating the configuration of a third conventional access control device.
Figure 8:
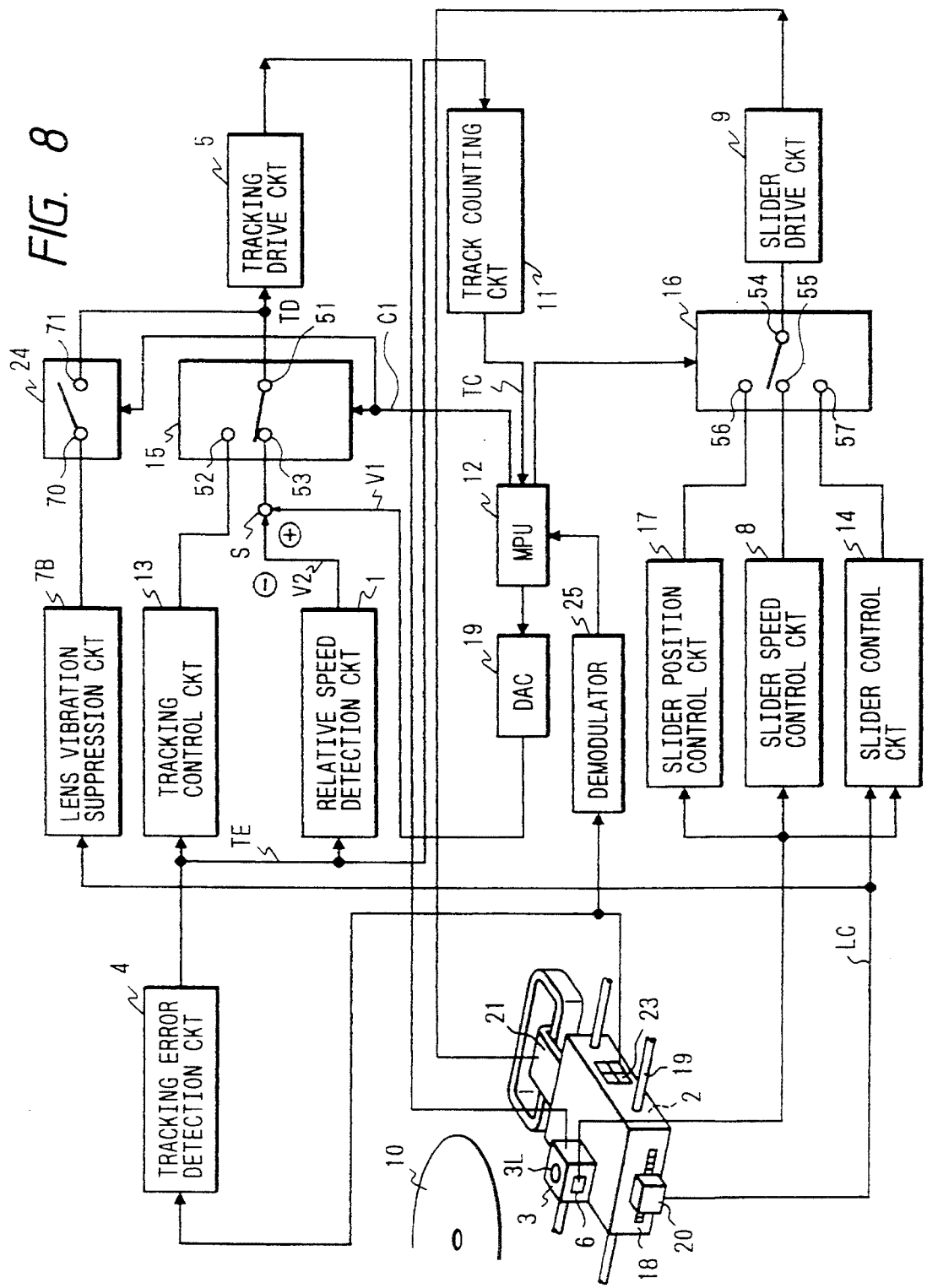
FIG. 8 is a schematic block diagram for illustrating the configuration of another access control device of the present invention.

FIG. 8 illustrates the configuration of this access control device (namely, the second embodiment) of the present invention, in which a lens vibration suppression circuit 7B is added to the first embodiment shown in FIG. 5(a). Further, FIG. 9 illustrates the configuration of an example of a lens vibration suppression circuit employed in the device of FIG. 8. Incidentally, in these figures, like reference characters denote corresponding parts of the conventional access control device of FIG. 4. Thus, the descriptions of such parts of the first embodiment will be omitted herein for brevity of the description. Additionally, an access operation of the access control device of FIG. 8 is similar to that of the first embodiment of the present invention.

As shown in FIG. 8, output signals LC of the lens position sensor 6 for detecting the position of the objective lens 3L are applied to the lens vibration suppression circuit 7B for suppressing the vibration of the objective lens 3L in addition to the slider control circuit 14 and the lens holding circuit 7A.

Moreover, an output terminal of the lens vibration suppression circuit 7B is connected to a terminal 70 of a switch 24, the other terminal 71 of which is connected to an input terminal of the tracking drive circuit 5.

When the operation to be performed by the device of FIG. 8 is changed to the tracking control operation (namely, the process advances from step S5 or S13 to step S6, the switch 24 is closed and thus the tracking drive circuit 5 becomes controlled by both of the tracking control circuit 13 and the lens vibration suppression circuit 7B. This lens vibration suppression circuit 7B is provided with a differentiating element or circuit and a non-linear amplifier. An example of the lens vibration suppression circuit is illustrated in FIG. 9.

Figure 9:
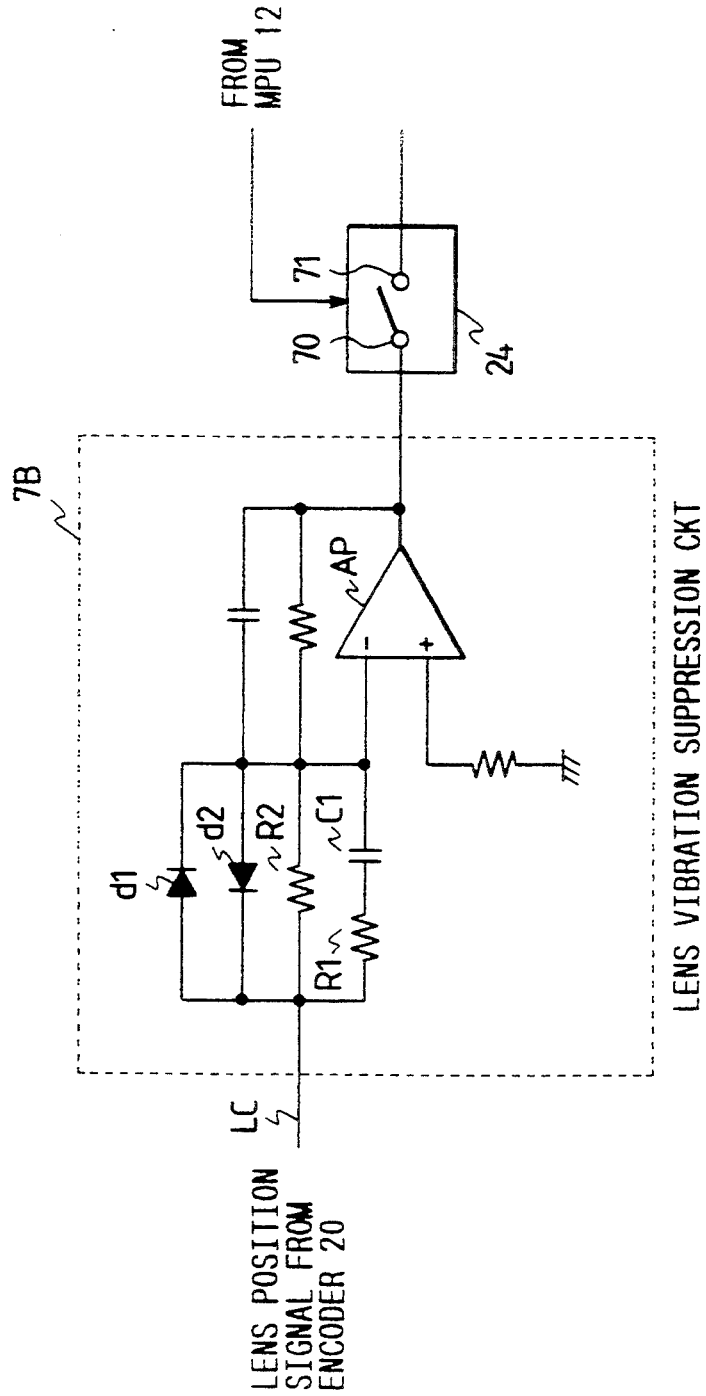
FIG. 9 is a circuit diagram for illustrating the configuration of a lens vibration suppression circuit of the device of FIG. 8.

Namely, as is seen from FIG. 9, this example of the lens vibration suppression circuit is provided with a differentiating element consisting of a capacitor C1 and resistors R1 and R2, and non-linear elements such as an amplifier AP and diodes d1 and d2.

Input-output characteristics of the lens vibration suppression circuit 7B of FIG. 9 is as follows. Namely, in the vicinity of a predetermined frequency, the amplification factor of the circuit 7B becomes larger in comparison with that obtained in a low-frequency region, and the phase of output signal thereof leads that of the input signal thereof. This results in increase in stability of closed-loop characteristics of the control system including the tracking actuator.

When an output (namely, the lens position signal) LC of the lens position sensor 6 increases, namely, when the current position of the objective lens 3L is largely shifted from a desired position thereof, the amplification factor of the lens vibration suppression circuit 7B increases and thus the force to put back the objective lens to the desired position thereof is increased. Conversely, when the difference between the current position of objective lens 3L and the desired position thereof becomes small, the diodes d1 and d2 do not conduct and consequently the circuit 7B comes to perform an ordinary operation thereof.

In the device of FIG. 8, the tracking control circuit 13 is provided for controlling the tracking drive circuit 5 in such a manner that the laser beam spot follows the center of the track. In contrast, the lens vibration suppression circuit 7B is provided therein for the purpose of suppressing unnecessary vibrations of the objective lens when the operation to be currently performed by the device is changed to the tracking control operation, thereby achieving such a change of the operation in a stable manner. Thus, it is only for 10 milli-seconds (ms) or so that outputs of the lens vibration suppression circuit 7B are supplied to the tracking drive circuit 5. Incidentally, preferable timing for supplying the output of the circuit 7B is realized by controlling the opening and closing of the switch 24 according to an output of the MPU.

While preferred embodiments of the present invention have been described above, it is to be understood that the present invention is not limited thereto and that other modifications will be apparent to those skilled in the art without departing from the spirit of the invention.

Namely, although access control devices for use in an optical disk system according to the present invention have been described hereinabove, the present invention is not limited thereto. The present invention can be effectively applied to, for instance, an access control device for use in a magnetic disk system.

The scope of the present invention, therefore, is to be determined solely by the appended claims.

What is claimed is:

1. An access control device for use in an optical disk system including an optical pickup device for recording information on and reproducing information from an optical disk having a concentric or spiral track for recording information thereon, a tracking actuator for controlling a laser beam spot on the optical disk in such a manner to follow a center of a track, a tracking error detection circuit for detecting a difference between the position of the laser beam spot and the center of the track and a tracking drive circuit for driving the tracking actuator according to an output of the tracking error detection circuit, said access control device for moving the laser beam spot to a target track, comprising:

a lens position sensor for detecting the position of an objective lens of the optical pickup device; and a lens vibration suppression circuit controlled according to an output of the lens position sensor for outputting a signal to suppress the vibration of the objective lens, wherein outputs of the lens vibration suppression circuit are supplied to the tracking drive circuit to suppress the vibration of the objective lens for a predetermined period of time immediately before and after a state of the optical disk system is changed from a state, in which the tracking actuator does not perform a control operation on the laser beam spot with respect to the track, to a state in which a tracking control operation is performed, wherein the lens vibration suppression circuit includes a non-linear amplifier and means for increasing an amplification factor thereof when the output of the lens position sensor becomes large.

2. An access control device for use in an optical disk system including an information recording disk medium which has a concentric or spiral track for recording information thereon, an optical pickup device for recording information on or reproducing information from the information recording disk medium, a tracking actuator for controlling the optical pickup device in such a manner to follow a center of a track, a tracking error detection circuit for detecting a difference between the position of the optical pickup device and the center of the track and for outputting a tracking error signal representing the detected difference and a tracking drive circuit for driving the tracking actuator, said access control device for moving the optical pickup device to a target track, comprising:

a relative speed detection circuit for detecting the relative speed of the optical pickup device with respect to the target track according to the tracking error signal inputted thereto from the tracking error detection circuit;

reference-speed signal generation means for outputting a reference radial speed signal indicating a reference value of the relative radial speed, at which a laser beam should travel with respect to the track, according to a distance between the target track and the laser beam;

a lens position sensor for detecting the position of an objective lens of the optical pickup device; and a lens vibration suppression circuit controlled according to an output of the lens position sensor for outputting a signal to suppress the vibration of the objective lens, wherein when a state of the optical disk system is changed from a state, in which the tracking actuator does not perform a control operation on the laser beam with respect to the track, to a state in which a tracking control operation is performed, before a tracking control operation is started the tracking drive circuit is controlled according to a difference between an output of the relative speed detection circuit and the reference speed signal, wherein outputs of the lens vibration suppression circuit are supplied to the tracking drive circuit to suppress the vibration of the objective lens for a predetermined period of time immediately before and after a state of the optical disk system is changed from a state, in which the tracking actuator does not perform a control operation on the optical pick-up device with respect to the track, to a state in which a tracking control operation is performed, wherein the lens vibration suppression circuit includes a non-linear amplifier and increases an amplification factor thereof when the output of the lens position sensor becomes large.

3. An access control device for use in an optical disk system including an optical pickup device for recording information on and reproducing information from an optical disk having a concentric or spiral track for recording information thereon, a tracking actuator for controlling a laser beam spot on the optical disk in such a manner to follow a center of a track, a tracking error detection circuit for detecting a difference between the position of the laser beam spot and the center of the track and a tracking drive circuit for driving the tracking actuator according to an output of the tracking error detection circuit, said access control device for moving the laser beam spot to a target track, comprising:

a lens position sensor for detecting the position of an objective lens of the optical pickup device; and a lens vibration suppression circuit controlled according to an output of the lens position sensor for outputting a signal to suppress the vibration of the objective lens, wherein outputs of the lens vibration suppression circuit are supplied to the tracking drive circuit to suppress the vibration of the objective lens for a predetermined period of time immediately before and after an operation to be currently performed by the optical disk system is changed to a tracking control operation, wherein the lens vibration suppression circuit includes a non-linear amplifier and is adapted to increase an amplification factor thereof when the output of the lens position sensor becomes large.

4. The access control device according to claim 2, wherein the reference-speed signal generation means comprises means receiving the tracking error signal for updating the reference value of the relative radial speed at each zero-crossing point of the received tracking error signal by replacing the reference value with a smaller reference value and for generating an updated reference radial speed signal representing the smaller reference value of the relative radial speed.

5. The access control device according to claim 1, wherein said means for increasing the amplification factor of the non-linear amplifier of said lens vibration suppression circuit operates for increasing a value of said amplification factor in a vicinity of a predetermined frequency in comparison with a value of said amplification factor for a low-frequency region, and further comprising means for providing for the signal outputted by the lens vibration suppression circuit a phase which leads a phase of a signal inputted thereto.

6. The access control device according to claim 1, wherein said means for increasing the amplification factor of the non-linear amplifier of said lens vibration suppression circuit operates for increasing a value of said amplification factor in a vicinity of a predetermined frequency in comparison with a value of said amplification factor for a low-frequency region, and further comprising means for providing for the signal outputted by the lens vibration suppression circuit a phase which leads a phase of a signal inputted thereto.

* * * * *